(12) United States Patent
Zheng et al.

(10) Patent No.: US 12,276,284 B2
(45) Date of Patent: Apr. 15, 2025

(54) ELECTRIC SUBMERSIBLE PUMP (ESP) ASSEMBLY SHAFT COUPLING WITH AXIAL LOAD HANDLING CAPABILITY

(71) Applicant: Halliburton Energy Services, Inc., Houston, TX (US)

(72) Inventors: Dezhi Zheng, Tulsa, OK (US); Donn J. Brown, Tulsa, OK (US); Wenjie Jie Guang, Tianjin (CN); Yuzhu Hu, Houston, TX (US); Jason Eugene Hill, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/705,672

(22) Filed: Mar. 28, 2022

(65) Prior Publication Data

US 2023/0304504 A1 Sep. 28, 2023

(51) Int. Cl.
*F04D 29/044* (2006.01)
*F04D 25/06* (2006.01)
(Continued)

(52) U.S. Cl.
CPC ....... *F04D 29/044* (2013.01); *F04D 25/0686* (2013.01); *F04D 29/426* (2013.01);
(Continued)

(58) Field of Classification Search
CPC .... F04D 13/021; F04D 25/06; F04D 25/0686; F04D 29/0405; F04D 29/044;
(Continued)

(56) References Cited

U.S. PATENT DOCUMENTS 3,006,671 A * 10/1961 Opocensky ........... F16B 35/005
                                                                     29/422
4,362,412 A     12/1982 Kunz
(Continued)

FOREIGN PATENT DOCUMENTS

CN         208364622 U * 1/2019 ............... F16D 3/16
WO       2010141490 A2   12/2010

OTHER PUBLICATIONS

Foreign Communication from Related Application—International Search Report and Written Opinion of the International Searching Authority, International Application No. PCT/US2022/052516, dated Apr. 19, 2023, 11 pages.

*Primary Examiner* — Kenneth J Hansen
*Assistant Examiner* — Chirag Jariwala
(74) *Attorney, Agent, or Firm* — Conley Rose, P.C.; Rodney B. Carroll

(57) ABSTRACT

An electric submersible pump (ESP) assembly. The ESP assembly comprises a first ESP component having a first drive shaft defining a plurality of male splines and defining at least one cut-out area; a second ESP component having a second drive shaft defining a plurality of male splines; a coupling shell defining a first plurality of female splines configured to mate with the male splines of the first drive shaft, a second plurality of female splines configured to mate with the male splines of the second drive shafts, and at least one shouldered aperture configured to align with the cut-out area of the first drive shaft; and at least one removable lug having a pin that is configured to extend through the shouldered aperture in the coupling shell to engage with the at least one cut-out area of the first drive shaft.

4 Claims, 9 Drawing Sheets

(51) Int. Cl.
*F04D 29/42* (2006.01)
*F04D 29/62* (2006.01)
*E21B 43/12* (2006.01)
*F16D 1/10* (2006.01)

(52) U.S. Cl.
CPC .......... *F04D 29/628* (2013.01); *E21B 43/128* (2013.01); *F16D 2001/103* (2013.01); *Y10T 403/7033* (2015.01)

(58) Field of Classification Search
CPC ...... F04D 29/04; F04D 29/043; F04D 29/426; F04D 29/628; F16D 1/02; F16D 1/10; F16D 1/104; F16D 1/108; F16D 2001/103; F16D 1/101; F16D 1/00; Y10T 403/7033; F16B 2200/69; F16B 2/065; E21B 17/02; E21B 43/12; E21B 43/121; E21B 43/128
USPC ............................................ 403/322.2, 359.5
See application file for complete search history.

(56) References Cited

U.S. PATENT DOCUMENTS

| | | | | |
|---|---|---|---|---|
| 4,523,871 | A | * | 6/1985 | Recker .................... F16D 1/116 403/322.2 |
| 4,603,998 | A | * | 8/1986 | Bober ..................... F16D 1/116 403/322.2 |
| 4,957,387 | A | * | 9/1990 | Nasu ..................... F16B 21/165 403/322.2 |
| 10,907,419 | B2 | | 2/2021 | Reeves et al. |
| 2002/0101078 | A1 | | 8/2002 | Robinson |
| 2002/0168244 | A1 | | 11/2002 | DiStasio et al. |
| 2004/0159442 | A1 | * | 8/2004 | Proctor ................ E21B 43/128 166/105 |
| 2010/0272504 | A1 | | 10/2010 | Sheth et al. |
| 2020/0072296 | A1 | * | 3/2020 | Mack ..................... F04D 13/10 |

* cited by examiner

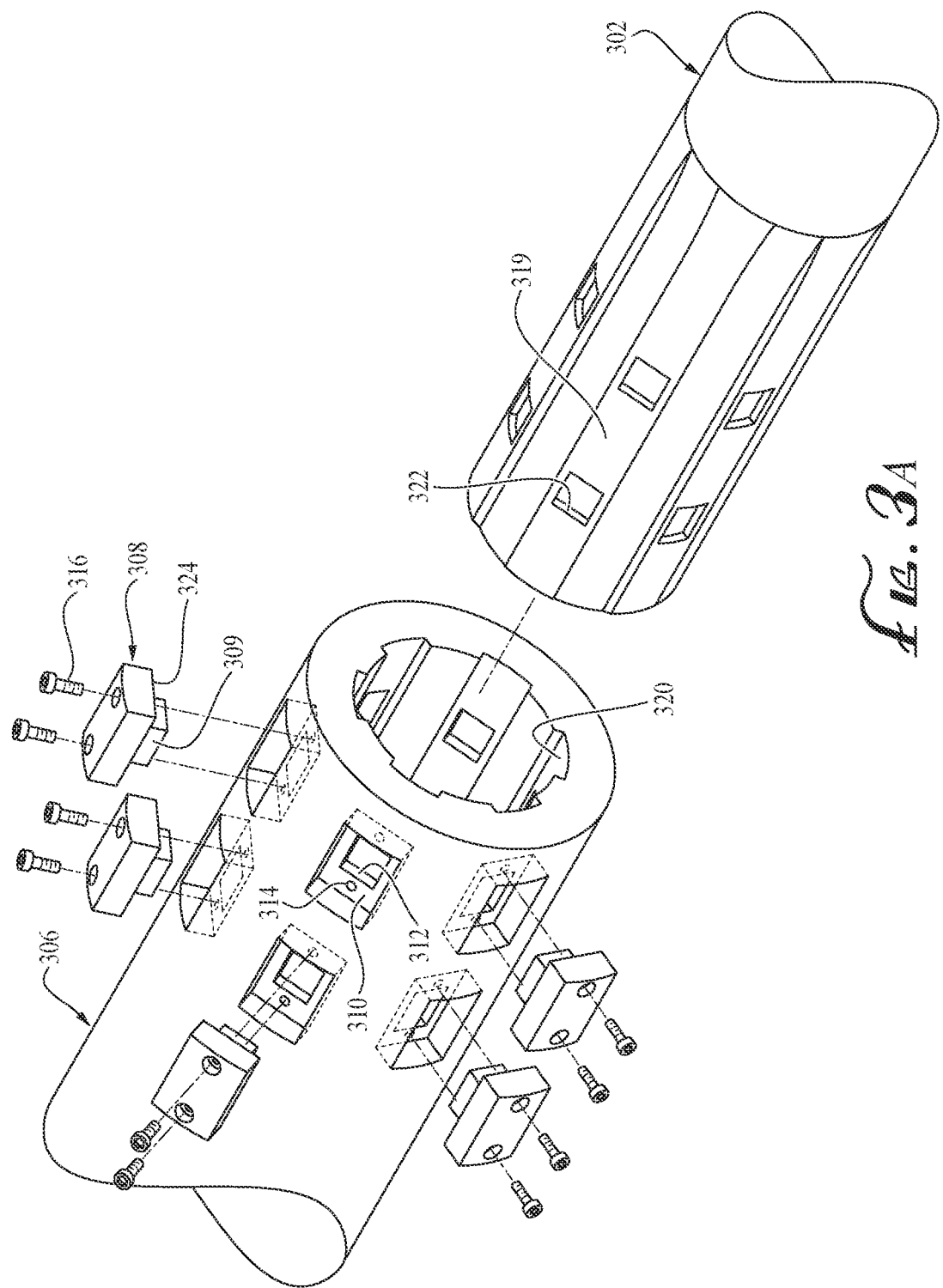

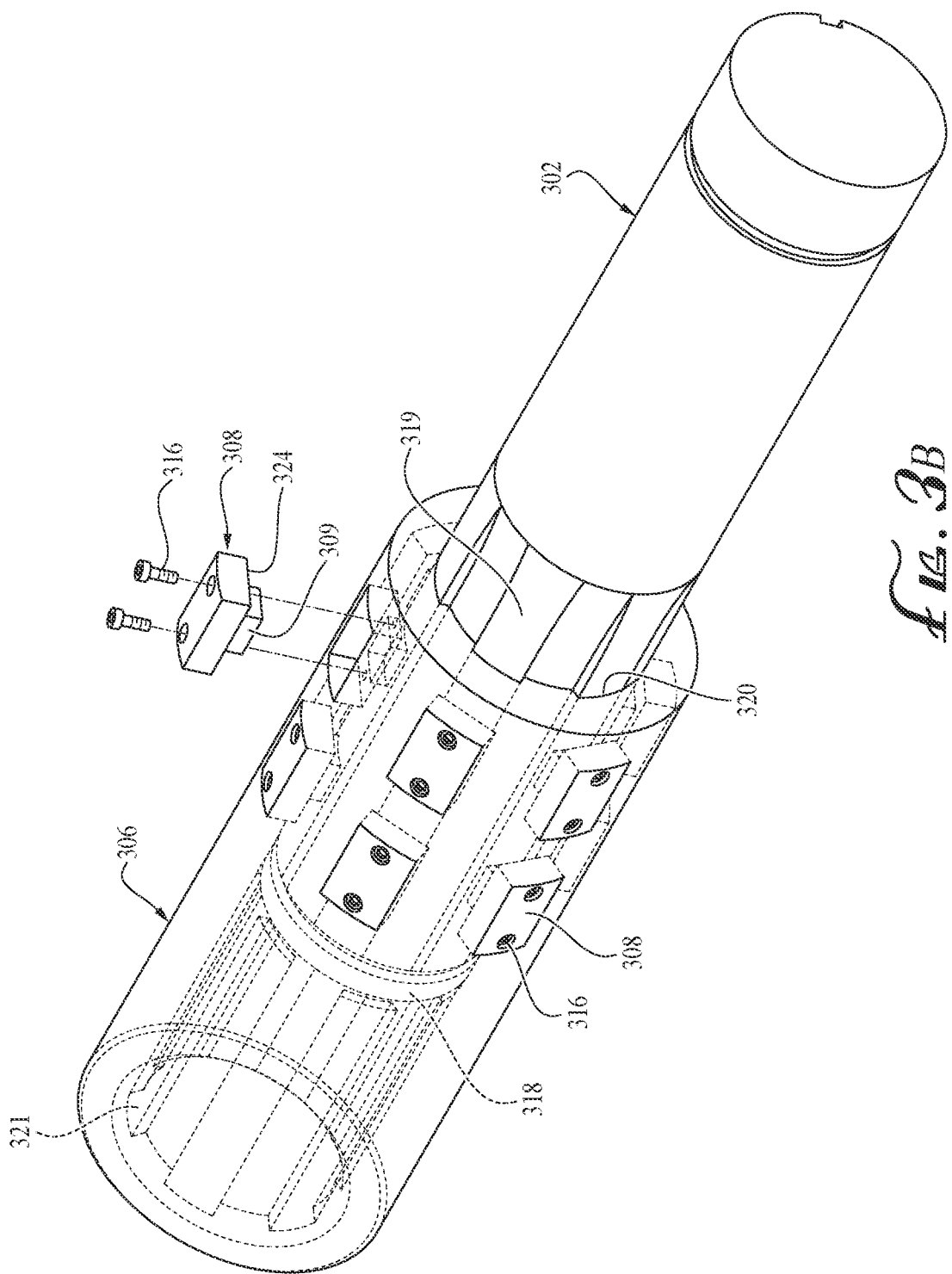

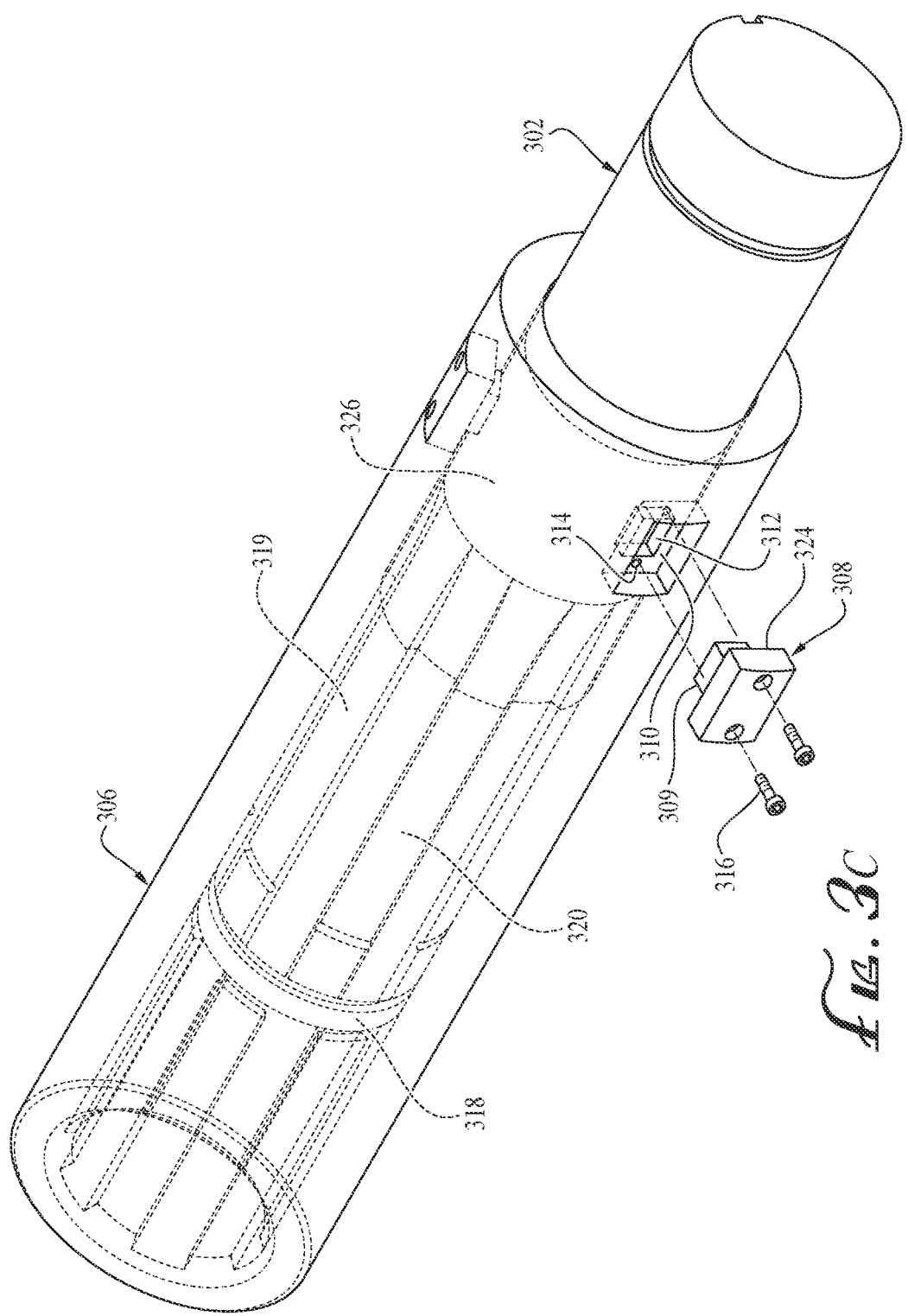

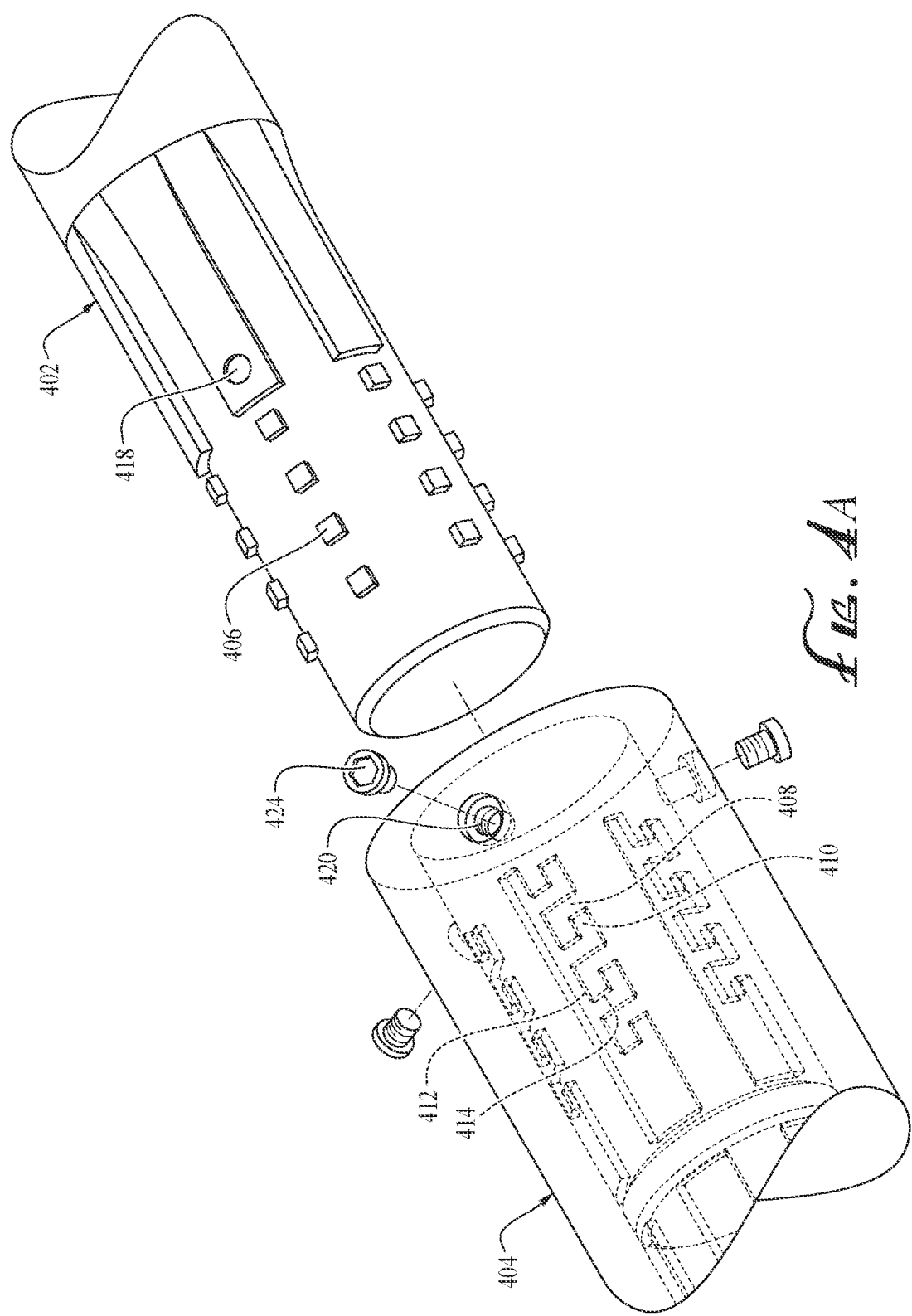

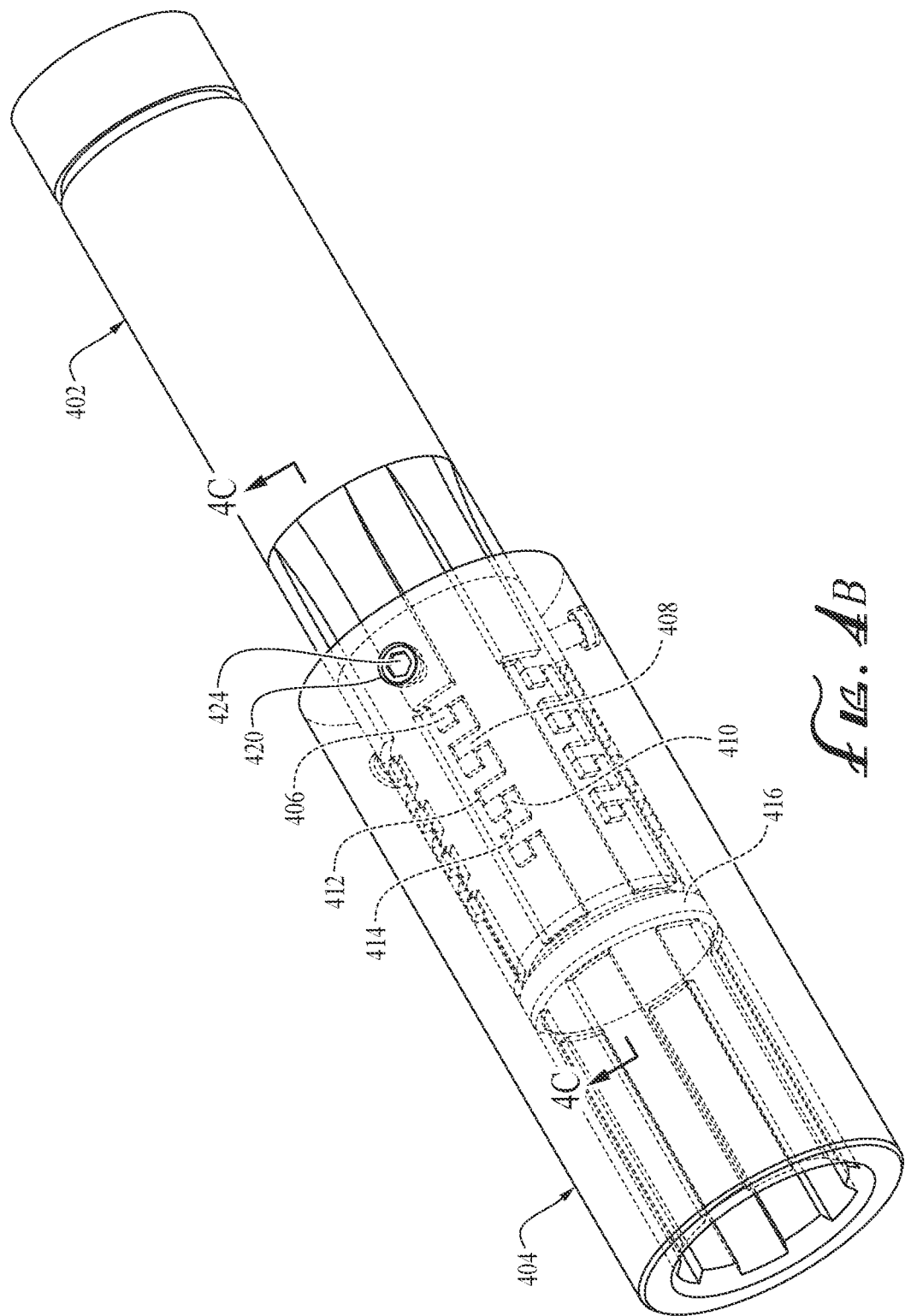

ELECTRIC SUBMERSIBLE PUMP (ESP) ASSEMBLY SHAFT COUPLING WITH AXIAL LOAD HANDLING CAPABILITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric submersible pump (ESP) assemblies may be installed in wellbores to lift fluid in the wellbore, for example lift the fluid in a production tubing installed uphole of the ESP assembly. The ESP assembly may comprise an electric motor, a seal unit coupled to the electric motor uphole of the electric motor, and a pump assembly coupled to the seal unit uphole of the electric motor. The pump assembly may comprise one or more centrifugal pump stages, where each pump stage comprises an impeller and a diffuser. Typically, a drive shaft of the electric motor couples to a drive shaft in the seal unit, and the drive shaft in the seal unit couples to a drive shaft in the pump assembly, whereby rotational power is delivered by the electric motor to the pump assembly. More particularly, the impeller or impellers are coupled to the drive shaft in the pump assembly and impart energy and pressure to the fluid, and the diffusers direct the fluid to the next stage's impeller or into the production tubing. It is understood that other ESP components can be part of the ESP assembly in different environments. For example, in some cases a gas separator may be placed uphole of the seal unit and downhole of the pump assembly. In this case, the drive shaft of the seal unit couples to a drive shaft in the gas separator, and the drive shaft in the gas separator couples to the drive shaft in the pump assembly. In some installations a sensor package or sensor unit may be coupled to the ESP assembly downhole of the electric motor. An electric power cable may be coupled to the electric motor and extend to a surface to an electric power supply at the surface, for example a variable speed drive or other source of electric power.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3A and FIG. 3B are illustrations of another axial coupling system according to an embodiment of the disclosure.

FIG. 3C is an illustration of yet another axial coupling system according to an embodiment of the disclosure.

FIG. 4A, FIG. 4B, and FIG. 4C are illustrations of yet another axial coupling system according to an embodiment of the disclosure.

DETAILED DESCRIPTION

Figure 1:
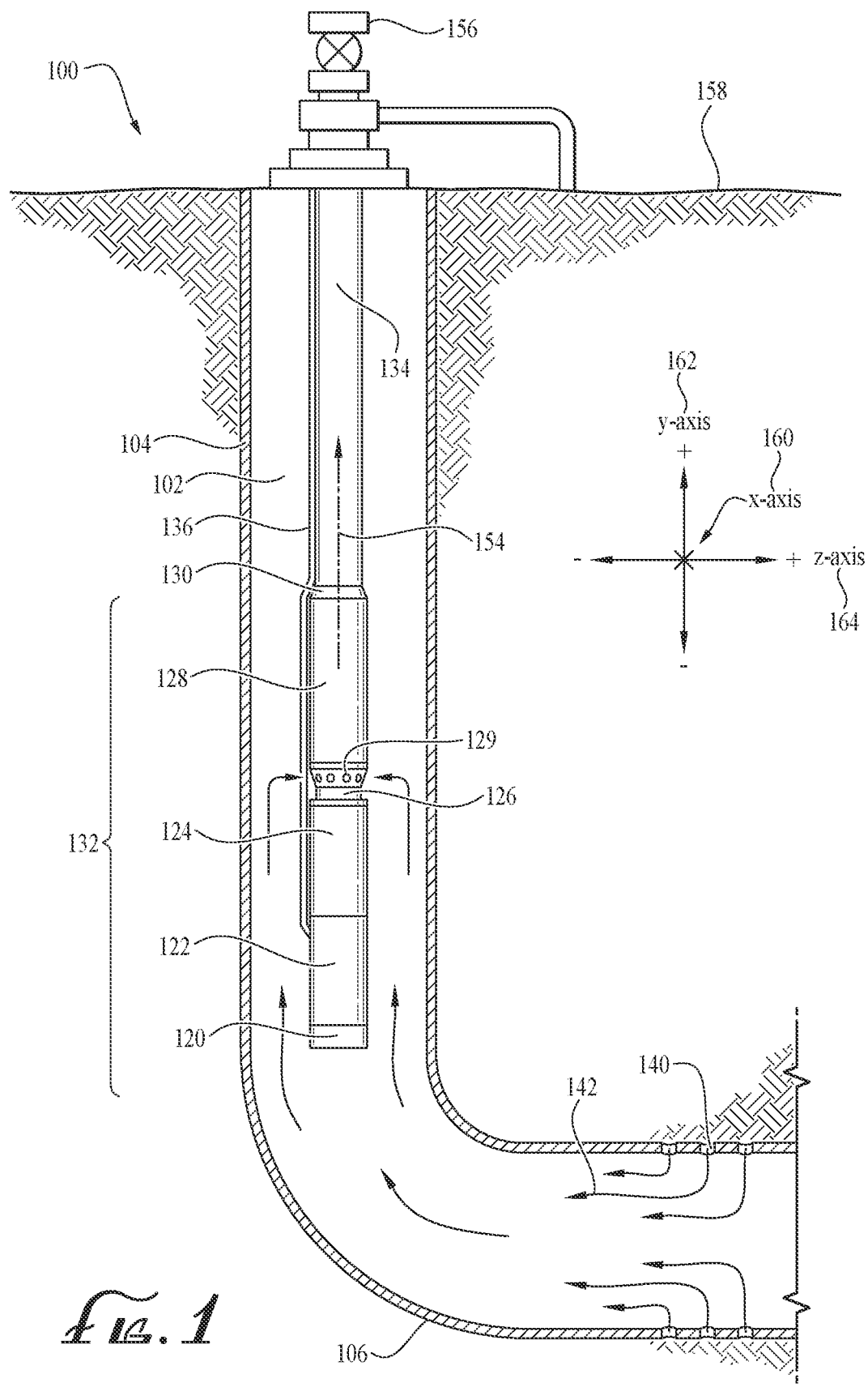
FIG. 1 is an illustration of an electric submersible pump (ESP) assembly in a wellbore according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Electric submersible pump (ESP) assemblies typically comprise a plurality of components that have drive shafts driven by a drive shaft of an electric motor. The electric motor can be viewed to be a prime mover, and the other drive shafts are receiving rotational energy transferred to them directly or indirectly from the drive shaft of the prime mover. These other drive shafts are coupled to each other, typically by a coupling shell that has female splines that mate with male splines on ends of the two drive shafts being coupled. The conventional coupling shell provides rotational coupling only and does not provide axial coupling. Said in other words, conventional coupling shells allow the drive shafts of the ESP components to slide in and out of the female splines of the coupling shell unless constrained by other structures (e.g., thrust bearings) within the ESP assembly.

Because ESP assemblies may be designed to exert only a downwards (e.g., downhole) thrust based on the conventional direction and operation of the pump assembly, a thrust bearing may be installed in a seal section of the ESP assembly to support this down thrust. In installations that may exert up thrust—and even in conventional installations that may experience up thrust during transient or unusual operating conditions—a second thrust bearing may need to be installed to support up thrust. This additional thrust bearing may be undesirable because it adds to the cost of the ESP assembly and/or because it takes up limited space within ESP components. The present disclosure teaches new structures and assembly methods that provide an alternative low-cost axial coupling that obviates the need of a second thrust bearing.

In one embodiment, an axial coupling is provided on one end of the coupling shell that retains a ball in a race attached to the coupling shell and a bolt or screw in a threaded opening of the race urges the ball into an aperture in the wall of the coupling shell to engage with a circumferential groove in a first drive shaft inserted into the coupling shell, thereby axially coupling the first drive shaft to the coupling shell. Another axial coupling mechanism may be used at the opposite end of the coupling shell to axially couple a second drive shaft to the first drive shaft. The coupling shell also rotationally couples the first and second drive shafts using mating splines.

In another embodiment, removable lugs are inserted into a shouldered opening in an outer surface of the coupling shell, a pin of the removable lugs passes through an aperture in the wall of the coupling shell, and engages into a cut-out area in the outer surface of the first drive shaft. The removable lugs are then secured by tightening bolts or screws into threaded holes in the shouldered opening in the outer surface of the coupling shell. The removable lugs may be secured by other kinds of attachment hardware, for example a band, bracket, or clamp that passes around an outside of the coupling shell. The pin of the removable lugs axially couples the first drive shaft to the coupling shell. Another axial coupling mechanism—or the same removable lug axial coupling mechanism —may be used to axially couple the second drive shaft to the first drive shaft. The coupling shell also rotationally couples the first and second drive shafts using mating splines.

In yet another embodiment, locking lugs are formed on an outside surface of the first drive shaft that mate with channels or grooves in an interior surface of the coupling shell. The locking lugs slide axially into the coupling shell, the first drive shaft is rotated to seat the locking lugs on one stop of the channels, then the first drive shaft is urged axially further into the coupling shell to seat the locking lugs on a second stop of the channels. In this position, a threaded screw is threaded into a threaded hole in the wall of the coupling shell and an end of the threaded screw engages with a detent in the outside surface of the first drive shaft to secure the first drive shaft and the locking lugs within the channels, wherein the first drive shaft is axially coupled to the coupling shell. Another axial coupling mechanism—or the locking lugs and channels coupling mechanism—may be used to axially couple the second drive shaft to the first drive shaft. The coupling shell also rotationally couples the first and second drive shafts. Details of these different embodiments are described below with reference to FIG. 2, FIG. 3A, FIG. 3B, FIG. 3C, FIG. 4A, FIG. 4B, and FIG. 4C.

Turning now to FIG. 1, a wellsite 100 is described. The wellsite 100 comprises a wellbore 102 optionally lined with a casing 104, an electric submersible pump (ESP) assembly 132 in the wellbore 102, and a production tubing string 134. The ESP assembly 132 comprises an optional sensor unit 120 at a downhole end, an electric motor 122 coupled to the sensor unit 120 uphole of the sensor unit 120, a seal section 124 coupled to the electric motor 122 uphole of the electric motor 122, a fluid intake 126 coupled to the seal section 124 uphole of the seal section 124, a pump assembly 128 coupled to the fluid intake 126 uphole of the fluid intake 126, and a pump discharge 130 coupled to the pump assembly 128 uphole of the pump assembly 128. The pump discharge 130 is coupled to the production tubing string 134. In an embodiment, a motor head or pot head (not shown) is coupled between the electric motor 122 and the seal section 124.

In an embodiment, the casing 104 has perforations 140 that allow reservoir fluid 142 to enter the wellbore 102 and flow downstream to the fluid intake 126. The reservoir fluid 142 enters inlet ports 129 of the fluid intake 126, flows from the fluid intake 126 into an inlet of the pump assembly 128, is pumped by the pump assembly 128 to flow out of the pump assembly 128 into the pump discharge 130 up the production tubing string 134 to a wellhead 156 located at the surface 134. In an embodiment, an electric cable 136 is connected to the electric motor 122 and provides electric power from an electric power source located at the surface 158 to the electric motor 122 to cause the electric motor 122 to turn and deliver rotational power to the pump assembly 128. In an embodiment, the electric cable 136 attaches to the electric motor 122 via a motor head or pot head.

In an embodiment, the pump assembly 128 comprises one or more centrifugal pump stages, where each centrifugal pump stage comprises an impeller coupled to a drive shaft of the pump assembly 128 and a diffuser retained by a housing of the pump assembly 128. An upper end of a drive shaft of the electric motor 122 is coupled to a lower end of a drive shaft of the seal section 124. An upper end of the drive shaft of the seal section 124 is coupled to a lower end of the drive shaft of the pump assembly 128. Rotational power is transferred from the drive shaft of the electric motor 122 to the drive shaft of the seal section 124 and from the drive shaft of the seal section 124 to the drive shaft of the pump assembly 128. In some contexts, the pump assembly 128 may be referred to as a centrifugal pump assembly. The pump assembly 128 may be said to lift the reservoir fluid 154 via the production tubing 134 to the surface 158.

In an embodiment, the ESP assembly 132 may comprise additional components. For example, the ESP assembly 132 may comprise a gas separator component uphole of the fluid intake 126 and downhole of the pump assembly 128. In this case, an upper end of the fluid intake 126 may be coupled to a lower end of the gas separator, and an upper end of the gas separator may be coupled to a lower end of the pump assembly 128. The gas separator may comprise a drive shaft that is coupled at a lower end to the upper end of the drive shaft of the seal section 124 and that is coupled at an upper end to the lower end of the drive shaft of the pump assembly 128. For example, the ESP assembly 132 may comprise a charge pump component uphole of the fluid intake 126 and downhole of the gas separator. The charge pump may impart energy and velocity to the reservoir fluid 142 to improve the performance of the gas separator. In this case, the upper end of the fluid intake 126 may be coupled to a lower end of the charge pump, and an upper end of the charge pump may be coupled to the lower end of the gas separator. The charge pump may comprise a drive shaft that is coupled at a lower end to the upper end of the drive shaft of the seal section 124 and that is coupled at an upper end to the lower end of the gas separator.

Each of the electric motor 122, the seal section 124, the pump assembly 128, the optional gas separator, and the optional charge pump may be said to be ESP components. It is a teaching of the present disclosure that a tie rod may be used to tether any of these ESP components to each other, via the drive shafts of the components, so as to prevent a part of the ESP assembly 132 from falling downhole in the event of a separation of the ESP assembly 132. This tie rod and associated structures are described below with reference to FIG. 2A, FIG. 2B, FIG. 2C, FIG. 2D, and FIG. 2E.

An orientation of the wellbore 102 and the ESP assembly 132 is illustrated in FIG. 1 by an x-axis 160, a y-axis 162, and a z-axis 164. While the wellbore 102 is illustrated in FIG. 1 as having a deviated portion or a substantially horizontal portion 106, the ESP assembly 132 may be used in a substantially vertical wellbore 102. While the wellsite 100 is illustrated as being on-shore, the ESP assembly 132 may be used in an off-shore location as well.

Figure 2:
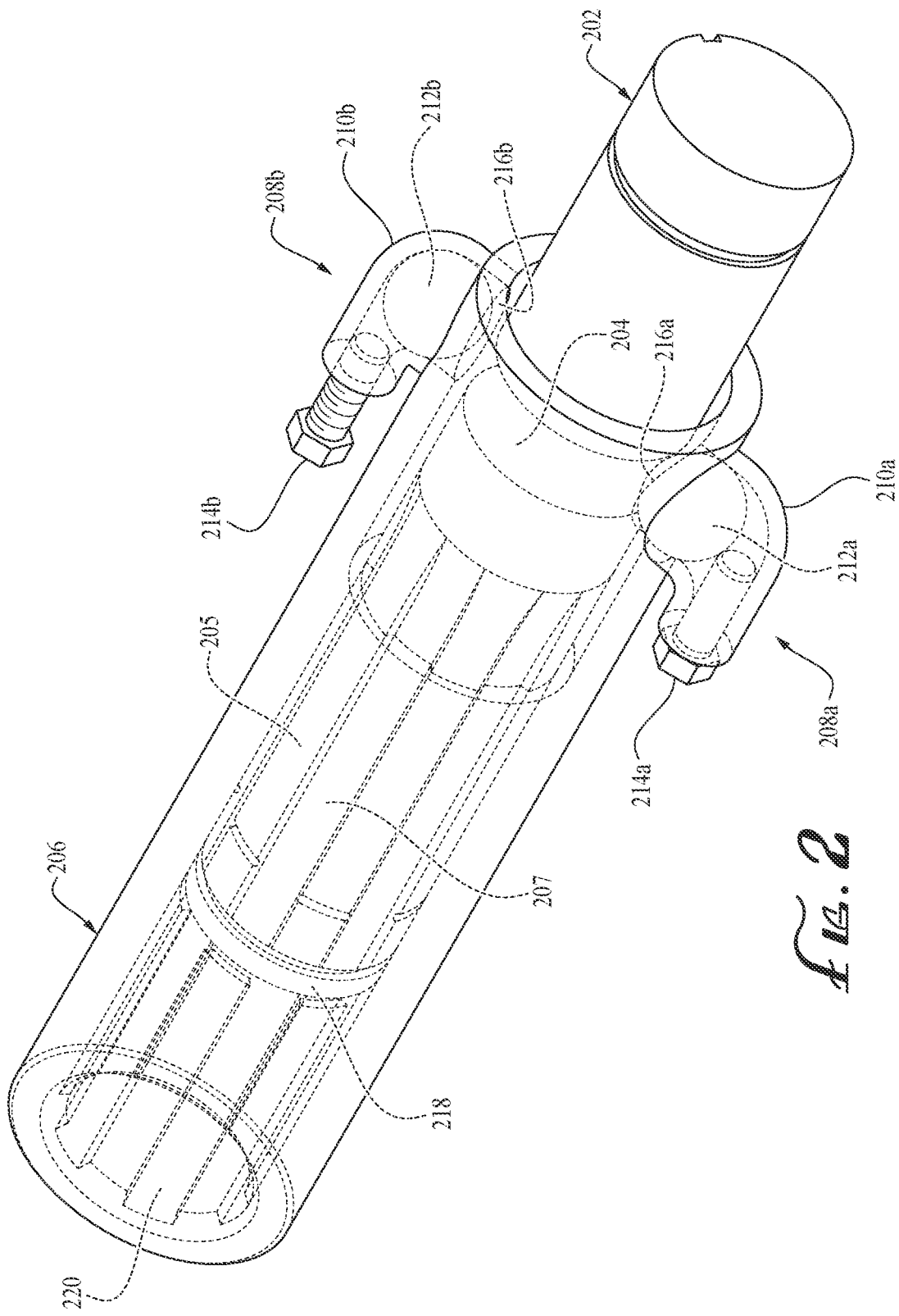
FIG. 2 is an illustration of an axial coupling system according to an embodiment of the disclosure.

Turning now to FIG. 2, first drive shaft 202 is illustrated mating with a coupling shell 206. The first drive shaft 202 defines a circumferential groove 204 and a plurality of male splines 205. When the first drive shaft 202 is inserted into the coupling shell 206, the male splines 205 mate with female splines 207 defined by an interior of the coupling shell 206 and rotationally couple the first drive shaft 202 to the coupling shell 206. In an embodiment, the coupling shell 206 comprises a plate 218 that stops the first drive shaft 202 when it is fully inserted into the interior of the coupling shell 206. The coupling shell further defines female splines 220 at an opposite side of the plate 218 from the female splines 207. The female splines 220 can mate with male splines of a second drive shaft (not shown) which can be inserted into the coupling shell at the open end opposite the end receiving the first drive shaft 202, thereby rotationally coupling the first drive shaft 202 to the second drive shaft.

The coupling shell 206 defines a plurality of apertures 216. A plurality of axial coupling mechanisms 208 are provided, each of which comprises a ball 212 and a channel or race 210 that is attached to the outside of the coupling shell 206 and has a threaded opening for receiving a bolt 214 or screw. The aperture 216, the race 210, and the bolt 214 capture the ball 212. When the bolt 214 is not seated fully into the threaded opening of the race 210, the ball 212 is free to move away from the aperture 216 and move back in the race 210 towards the opening of the race 210, until it is stopped by the end of the bolt 214. This freedom of motion is best seen in axial coupling mechanism 208b and the ball 212b, the race 210b, the bolt 214b, and the aperture 216b. It is understood that the coupling mechanism 208 may be used to axially couple a second drive shaft (not shown) inserted into the coupling shell 206 on an opposite side of the plate 218 from the first drive shaft 202 or a different axial coupling mechanism may be used there. While the axial coupling mechanisms 208 are illustrated in FIG. 2 as protruding from a side of coupling shell 206 by almost ½ the inside diameter of the coupling shell 206, FIG. 2 is not intended to be drawn to scale, the coupling mechanisms 208 are drawn large to promote better seeing and understanding the operation of the axial coupling mechanisms 208, and in a practical implementation the coupling mechanisms 208 may be significantly smaller than depicted in FIG. 2.

When the first shaft 202 is fully inserted into the coupling shell 206 and is stopped by the plate 218, the circumferential groove 204 aligns with the apertures 216. By screwing the bolt 214 into the race 210, the ball 212 is urged into the aperture 216 and into engagement with the circumferential groove 204 such that the first drive shaft 202 and the coupling shell 206 are axially coupled. This axial coupling is best seen in axial coupling mechanism 208a and the ball 212a, the race 210a, the bolt 214a, and the aperture 216a.

Turning now to FIG. 3A, FIG. 3B, and FIG. 3C, a different axial coupling mechanism is described. A first drive shaft 302 defines male splines 319 that mate with female splines 320 defined by the interior of a coupling shell 306. A plate 318 may form part of the coupling shell 306 and provides a stop for an end of the first drive shaft 302 inserted into an open end of the coupling shell 306. The coupling shell 306 defines female splines 321 at an end of the coupling shell 306 opposite the female threads 320 which can mate with male splines of a second drive shaft (not shown) which may be inserted into an open end of the coupling shell 306 on the other side of the plate 318, thereby rotationally coupling the first drive shaft 302 to the second drive shaft.

Cut-outs 322 may be defined by the male splines 319. The coupling shell 306 may defined shouldered slots 310 and apertures 312 that align with the cut-outs 322 when the first drive shaft 302 is fully inserted into the opening of the coupling shell 306 and seated against the plate 318. Coupling lugs 308 having a pin 309 may be inserted into the apertures 312 and engage with the cut-outs 322 in the surface of the male splines 319. The shoulders 324 of the coupling lugs 308 seat into the shouldered slots 310. The coupling lugs 308 may be secured in place by attaching hardware 316 (e.g., bolts or screws) that engage with threaded holes 314 in the shouldered slots 310. In an embodiment, the coupling lugs 308 may be securely attached to the coupling shell 306 by different attachment hardware, for example by brackets, bands, or clamps. In an embodiment, a seal may be provided between the coupling lugs 308 and the aperture 312 and/or the shouldered slots 310, whereby to prevent fluid flow through the apertures 312. In an embodiment, a housing of a component of the ESP assembly 132 may provide access ports through which the coupling lugs 308 may be installed and attaching hardware 316 may be installed. In an embodiment, the access ports may be closed with covers that are secured in place on the outside of the housing of the ESP component. When secured in place, the pins 309 of the coupling lugs 308 axially couple the coupling shell 306 and the first drive shaft 302. The pins 309 of the coupling lugs 308 also rotationally couple the coupling shell 306 and the first drive shaft 302. Additionally, the mating of the male splines 319 with the female splines 320 also rotationally couple the coupling shell 306 and the first drive shaft 302.

In an embodiment, the cut-outs 322 are located not on the male splines 319 but instead on a spline-free area 326 of the first drive shaft 302. In some embodiments this may be a preferred configuration as it may provide better integrity (e.g., greater strength) of the male splines 319 if they are not cut with a machining process to produce the cut-outs 322.

Figure 4C:
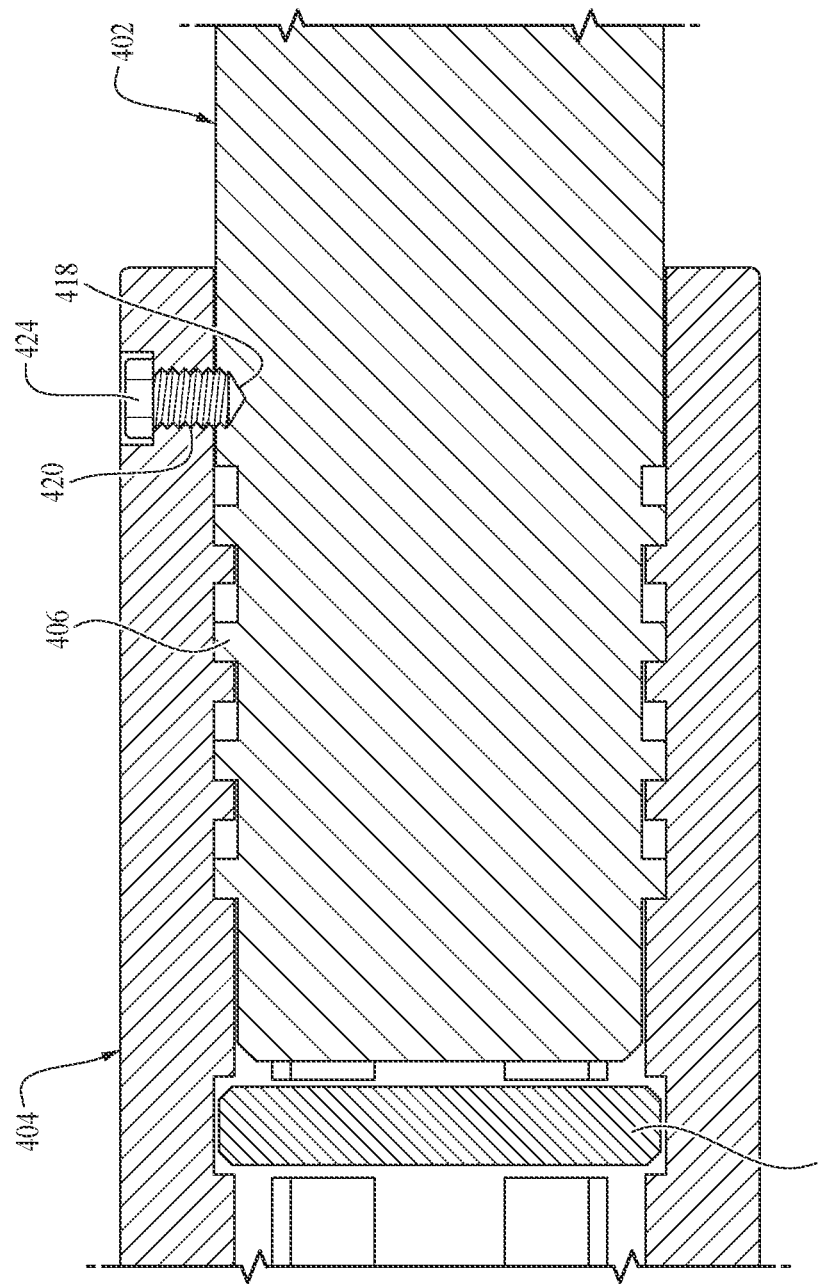

Turning now to FIG. 4A, FIG. 4B, and FIG. 4C, a different axial coupling mechanism is described. In an embodiment, a first drive shaft 402 defines a plurality of locking lugs 406 that comprise raised areas on the surface of the first drive shaft 402. While illustrated in FIG. 4A and FIG. 4B as a column with square cross-section geometry, the locking lugs 406 may have other shapes. For example, the locking lugs 406 may have an oval cross-section, a circular cross-section, or some other cross-section geometry.

A coupling shell 404 defines channels 408 that are defined by an interior surface of the coupling shell 404. In an embodiment, the channels 408 may be machined into the interior surface of the coupling shell 404. In an embodiment, the channels 408 may be cast into the interior surface of the coupling shell 404. In an embodiment, the coupling shell 404 may be formed in a 3-D printing process and may define the channels 408 in the printing process. The channels 408 define stops 412 at a point where the channel makes a turn and define stops 414 at the end of the channels 408. In an embodiment, the channels 408 form an L-shaped profile.

The end of first drive shaft 402 where the locking lugs 406 are defined may be inserted into the open end of the coupling shell 404, with the locking lugs 406 passing into the coupling shell 404. When the locking lugs 406 align with the openings of the channels 408, the first drive shaft 402 may be rotated to cause the locking lugs 406 to enter the channels 408 and rotate until the locking lugs 406 are stopped by stops 412. The first drive shaft 402 can then be inserted axially further into the coupling shell 404 until the locking lugs 406 are stopped by stops 414. In this position, the channels 408 and the locking lugs 406 rotationally couple the first drive shaft 402 to the coupling shell 404. In an embodiment, the ESP assembly 132 may be operated with the first drive shaft 402 and the coupling shell 404 coupled in this way and a second drive shaft rotationally and axially coupled to the coupling shell 404 at an opposite end of the coupling shell 404. The locking lugs 406 may move axially with respect to the coupling shell 404 within a narrow range of axial travel while stopped against the stops 412 during operation.

In an embodiment, the coupling shell 404 defines one or more threaded holes 420 that receive a bolt 424 or screw that threadingly mates with the threaded holes 420. When the coupling lugs 406 are seated against the stop 414, the threaded holes 420 align with detents 418 or holes in the surface of the first drive shaft 402. When the bolts 424 are fully tightened, the end of the bolt 424 engages with the detents 418 and further axially couple the first drive shaft 402 to the coupling shell 404.

When the ESP assembly 132 is removed from the wellbore 102 and disassembled, the axial coupling of the first drive shaft 402 to the coupling shell 404 can be released by removing the bolts 424, if present, axially pulling the first drive shaft 402 away from the coupling shell 404 so that the locking lugs 406 move away from the stop 414, and rotating the first drive shaft 402 to move the locking lugs 406 away from the stops 412 and out of the channels 408. Then the first drive shaft 402 can be completely removed from the coupling shell 404.

Figure 5:
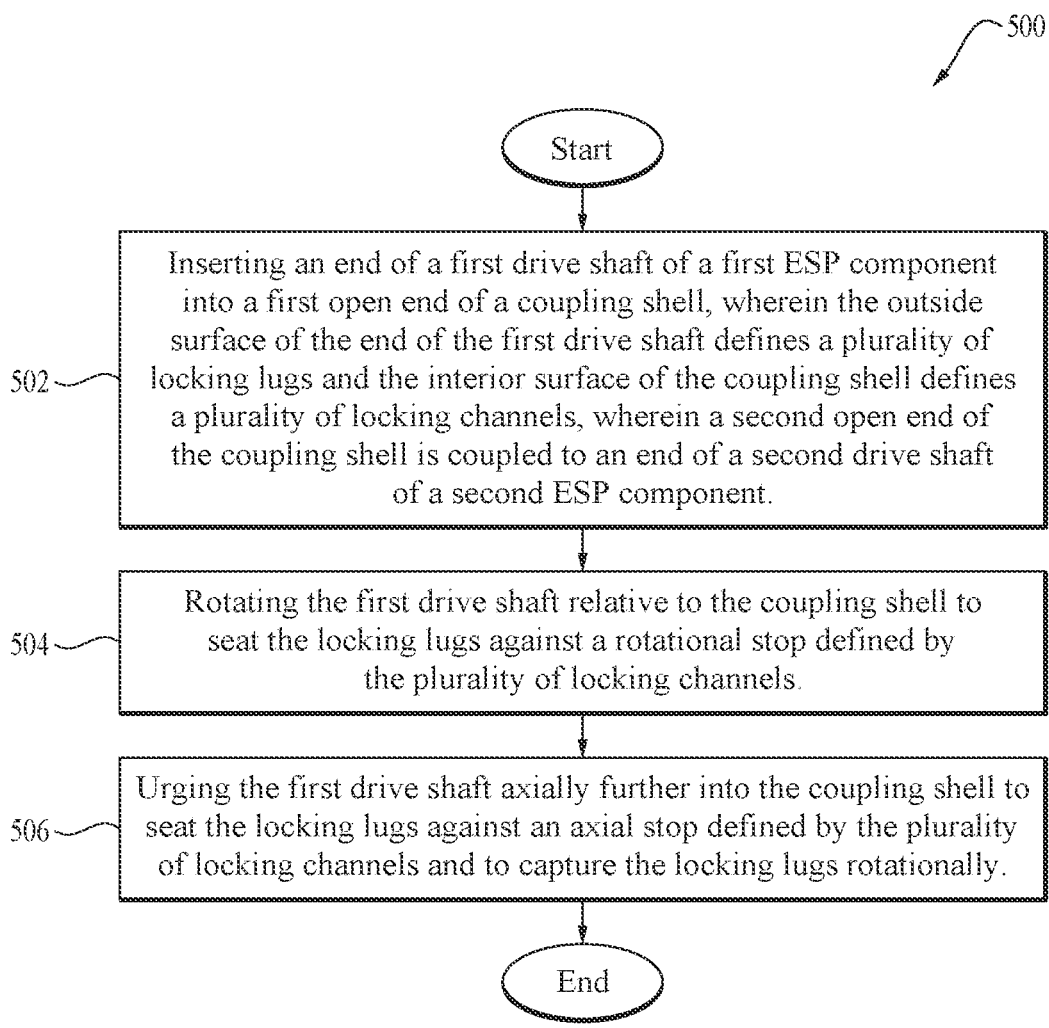
FIG. 5 is a flow chart of a method according to an embodiment of the disclosure.

Turning now to FIG. 5, a method 500 is described. In an embodiment, the method 500 is a method of assembling an electric submersible pump (ESP) assembly. At block 502, the method 500 comprises inserting an end of a first drive shaft of a first ESP component into a first open end of a coupling shell, wherein the outside surface of the end of the first drive shaft defines a plurality of locking lugs and the interior surface of the coupling shell defines a plurality of locking channels, wherein a second open end of the coupling shell is coupled to an end of a second drive shaft of a second ESP component.

At block 504, the method 500 comprises rotating the first drive shaft relative to the coupling shell to seat the locking lugs against a rotational stop defined by the plurality of locking channels. At block 506, the method 500 comprises urging the first drive shaft axially further into the coupling shell to seat the locking lugs against an axial stop defined by the plurality of locking channels and to capture the locking lugs rotationally.

In an embodiment, the method 500 further comprises threading attachment hardware into a threaded hole in the coupling shell that is aligned with a detent in the exterior surface of the first drive shaft until an end of the attachment hardware engages with the detent in the exterior surface of the first drive shaft. In an embodiment, the method 500 further comprises, after threading attachment hardware into the threaded hole in the coupling shell, unthreading the attachment hardware out of the threaded hole; and, after unthreading the attachment hardware, rotating the first drive shaft relative to the coupling shell to unseat the lock lugs against the rotation stop defined by the plurality of locking channels; and extracting the end of the first drive shaft from the coupling shell.

In an embodiment, the first ESP component is an electric motor, and the second ESP component is a seal section. In an embodiment, the first ESP component is a seal section, and the second ESP component is a gas separator. In an embodiment, the first ESP component is a seal section and the second ESP component is a pump assembly. In an embodiment, it may be the case that the electric motor drive shaft is axially coupled to the drive shaft of the seal section as described in method 200; the seal section drive shaft is axially coupled to the drive shaft in the gas separator as described in method 200; and the gas separator drive shaft is axially coupled to the drive shaft in the pump assembly as described in method 200.

ADDITIONAL DISCLOSURE

A first embodiment which is a coupling shell configured to axially and rotationally couple two drive shafts together, comprising: a first plurality of female splines defined at a first end of an interior of the coupling shell, wherein the first plurality of female splines are configured for rotationally coupling with corresponding male splines defined by a first of the two drive shafts; and a plurality of axial coupling fixtures, wherein each axial coupling fixture comprises a metal ball captured between an aperture in a side wall of the coupling shell and a race attached to the outside of the side wall of the coupling shell and an adjustment bolt threaded into a threaded hole of the race that is configured to urge the metal ball into engagement with a circumferential groove defined by an outside of the first of the two drive shafts.

A second embodiment, which is the coupling shell of the first embodiment, wherein the coupling shell defines a second plurality of female splines at a second end of the interior of the coupling shell that are configured for rotationally coupling with corresponding male splines defined by a second of the two drive shafts and wherein the coupling shell is configured to axially couple to the second of the two drive shafts using coupling lugs.

A third embodiment, which is the coupling shell of the first embodiment, wherein the coupling shell defines a plurality of locking channels at a second end of the interior of the coupling shell that are configured to engage with locking lugs defined by an outside of the second drive shaft to axially and rotationally couple to the second drive shaft.

A fourth embodiment, which is the coupling shell of the first embodiment, further comprising a second plurality of axial coupling fixtures, wherein each second axial coupling fixture comprises a metal ball captured between an aperture in a side wall of the coupling shell and a race attached to the outside of the side wall of the coupling shell and an adjustment bolt threaded into a threaded hole of the race that is configured to urge the metal ball into engagement with a circumferential groove defined by an outside of a second of the two drive shafts.

A fifth embodiment, which is the coupling shell of the first embodiment, wherein the first drive shaft is located in a first component of an electric submersible pump (ESP) assembly and the second drive shaft is located in a second component of the ESP assembly.

A sixth embodiment, which is the coupling shell of the fifth embodiment, wherein the first component and second component are selected from the list of components consisting of an electric motor, a seal section, a pump assembly, a gas separator, and a charge pump.

A seventh embodiment, which is an electric submersible pump (ESP) assembly, comprising: a first ESP component having a first drive shaft defining a plurality of male splines and defining at least one cut-out area; a second ESP component having a second drive shaft; a coupling shell defining a first plurality of female splines configured to mate with the male splines of the first drive shaft and at least one shouldered aperture configured to align with the cut-out area of the first drive shaft; and at least one removable lug having a pin that is configured to extend through the shouldered aperture in the coupling shell to engage with the at least one cut-out area of the first drive shaft.

An eighth embodiment, which is the ESP assembly of the seventh embodiment, wherein the at least one cut-out area is defined on at least one of the male splines of the first drive shaft.

A ninth embodiment, which is the ESP assembly of the seventh embodiment, wherein the at least one cut-out area is defined on an area of a surface of the first drive shaft that does not feature male splines.

A tenth embodiment, which is the ESP assembly of the seventh embodiment, wherein a housing of the first ESP component or a housing of the second ESP component defines an at least one access port for accessing the at least one removable lug.

An eleventh embodiment, which is the ESP assembly of the seventh embodiment, wherein the at least one removable lug is secured to the coupling shell using at least one threaded bolt or at least one threaded screw.

A twelfth embodiment, which is the ESP assembly of the seventh embodiment, wherein the at least one removable lug is secured to the coupling shell using at least one bracket.

A thirteenth embodiment, which is the ESP assembly of the seventh embodiment, wherein the at least one removable lug is secured to the coupling shell using at least one clamp.

A fourteenth embodiment, which is the ESP assembly of the seventh embodiment, wherein the second drive shaft defines at least one cut-out area and the coupling shell defines at least one shouldered aperture configured to align with the at least one cut-out area defined by the second drive shaft.

A fifteenth embodiment, which is a method of assembling an electric submersible pump (ESP) assembly, comprising: inserting an end of a first drive shaft of a first ESP component into a first open end of a coupling shell, wherein the outside surface of the end of the first drive shaft defines a plurality of locking lugs and the interior surface of the coupling shell defines a plurality of locking channels, wherein a second open end of the coupling shell is coupled to an end of a second drive shaft of a second ESP component; rotating the first drive shaft relative to the coupling shell to seat the locking lugs against a rotational stop defined by the plurality of locking channels; and urging the first drive shaft axially further into the coupling shell to seat the locking lugs against an axial stop defined by the plurality of locking channels and to capture the locking lugs rotationally.

A sixteenth embodiment, which is the method of the fifteenth embodiment, further comprising threading attachment hardware into a threaded hole in the coupling shell that is aligned with a detent in the exterior surface of the first drive shaft until an end of the attachment hardware engages with the detent in the exterior surface of the first drive shaft.

A seventeenth embodiment, which is the method of the sixteenth embodiment, further comprising: after threading attachment hardware into the threaded hole in the coupling shell, unthreading the attachment hardware out of the threaded hole; after unthreading the attachment hardware, rotating the first drive shaft relative to the coupling shell to unseat the lock lugs against the rotation stop defined by the plurality of locking channels; and extracting the end of the first drive shaft from the coupling shell.

An eighteenth embodiment, which is the method of the fifteenth embodiment, wherein the first ESP component is an electric motor and the second ESP component is a seal section.

A nineteenth embodiment, which is the method of the fifteenth embodiment, wherein the first ESP component is a seal section and the second ESP component is a gas separator.

A twentieth embodiment, which is the method of the fifteenth embodiment, wherein the first ESP component is a seal section and the second ESP component is a pump assembly.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A coupling shell configured to axially and rotationally couple two drive shafts together, comprising:
    a first plurality of female splines defined at a first end of an interior of the coupling shell, wherein the first plurality of female splines are configured for rotationally coupling with corresponding male splines defined by a first drive shaft of the two drive shafts; and
    a first plurality of axial coupling fixtures, wherein each of the first plurality of axial coupling fixtures comprises a metal ball captured between an aperture in a side wall of the coupling shell and a race attached to an exterior of the coupling shell and an adjustment bolt threaded into an axially directed threaded hole of the race that is configured to urge the metal ball radially into engagement with a circumferential groove defined by an outside of the first drive shaft of the two drive shafts.

2. The coupling shell of claim 1, further comprising a second plurality of axial coupling fixtures, wherein each of the second plurality of axial coupling fixtures comprises a corresponding metal ball captured between corresponding aperture in the side wall of the coupling shell and a corresponding race attached to the exterior of the coupling shell and corresponding adjustment bolt threaded into an axially directed threaded hole of the corresponding race that is configured to urge the corresponding metal ball radially into engagement with a circumferential groove defined by an outside of a second drive shaft of the two drive shafts.

3. The coupling shell of claim 1, wherein the first drive shaft is located in a first component of an electric submersible pump (ESP) assembly and a second drive shaft of the two drive shafts is located in a second component of the electric submersible pump (ESP) assembly.

4. The coupling shell of claim 3, wherein the first component and second component are selected from a list of components consisting of an electric motor, a seal section, a pump assembly, a gas separator, and a charge pump.

* * * * *